UNITED STATES PATENT OFFICE.

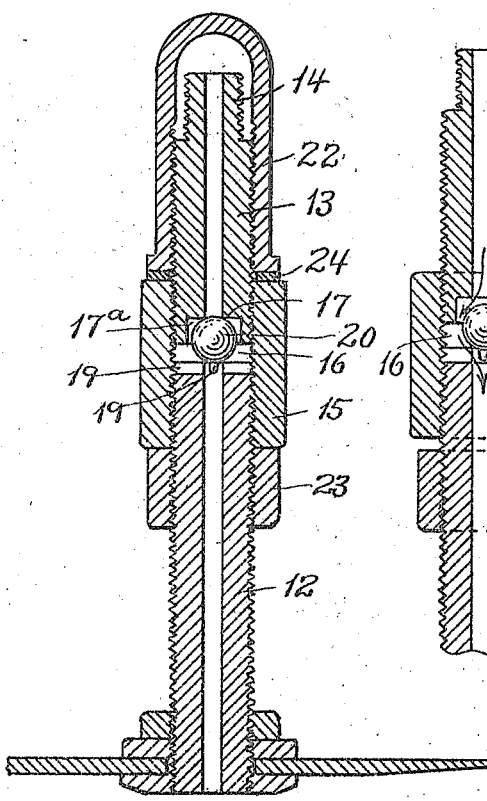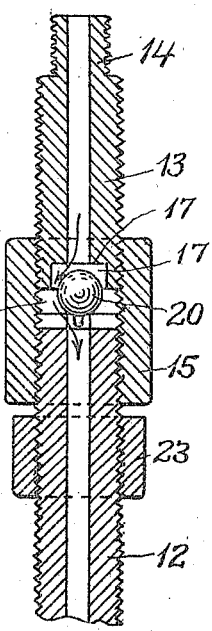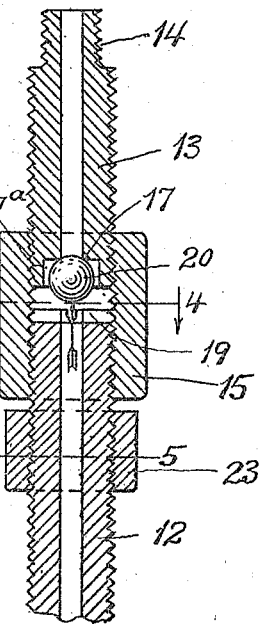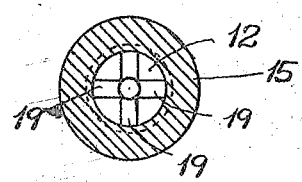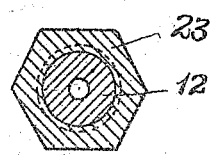

JOHN H. POOLE, OF BRIDGEWATER, MASSACHUSETTS, ASSIGNOR, BY DIRECT AND MESNE ASSIGNMENTS, TO ASHTON HAMILTON, TRUSTEE, OF BROCKTON, MASSACHUSETTS.

PNEUMATIC-TIRE VALVE.

1,263,599.

Specification of Letters Patent.   Patented Apr. 23, 1918.

Application filed December 8, 1917.  Serial No. 206,301.

*To all whom it may concern:*

Be it known that I, JOHN H. POOLE, a citizen of the United States, residing at Bridgewater, in the county of Plymouth and State of Massachusetts, have invented new and useful Improvements in Pneumatic-Tire Valves, of which the following is a specification.

This invention relates to a pneumatic tire valve comprising a tubular stem adapted at one end to be secured to an inflatable tire tube, and at the other end to be coupled to a conduit connected with an air pump, the body being provided internally with controlling means permitting air to be forced inwardly into the tire tube and normally preventing escape of air therefrom.

The invention has for its object to provide a simple, relatively inexpensive, and durable valve structure free from liability to derangement and leakage of air.

The invention is embodied in the improvements which I will now proceed to describe and claim.

Of the accompanying drawings forming a part of this specification,—

Figure 1 is an enlarged longitudinal section of a tire valve embodying my invention.

Figs. 2 and 3 are views similar to Fig. 1, showing a different adjustment.

Fig. 4 is a section on line 4—4 of Fig. 3.

Fig. 5 is a section on line 5—5 of Fig. 3.

The same reference characters indicate the same parts in all of the figures.

My improved valve comprises an inner tubular terminal stem member 12 adapted as usual at its inner end for attachment to a tire tube, an outer tubular terminal stem member 13 adapted at its outer end, by means such as a screw-threaded nipple 14, for connection with a conduit leading from an air pump, and an intermediate stem member formed as a tubular connecting sleeve 15 connecting said terminal members and constituting the margin of a valve chamber 16, between the air passages extending through the members 12 and 13, the opposed ends of the members 12 and 13 constituting the ends of said chamber.

The inner end of the outer member 13 is provided with a valve seat 17 which is preferably at the inner end of a recess 17ª formed in said member.

The outer end of the inner member 12 is formed as an air-conducting stop, the flat outer end face of said inner member surrounding the air passage therein, being provided with channels 19 permitting air to pass freely from the valve chamber 16 to the inner member 12 and from said inner member to the valve chamber.

20 represents a preferably spherical valve, the diameter of which is greater than that of the seat 17, less than the diameter of the recess 17ª, and greater than the depth of said recess. When the valve is seated, as shown by Figs. 1 and 3, a relatively small zone of its periphery bears on and closely fits the seat, the major portion of the valve projecting from the seat and from the recess, and being exposed to air pressure in the chamber 16.

I provide means for varying the distance between the valve seat and the air-conducting stop above described, and thus either elongating or contracting the air chamber, the object of the said elongation being to permit the valve to leave the seat and bear on the air-conducting stop. The object of the said contraction is to cause the stop to lock the valve against its seat.

I prefer to embody said means in external screw threads formed on the members 12 and 13, said members being of equal diameter and the threads being of similar size, and an internal screw thread formed in the connecting sleeve 15, adapted to engage the threads on the said members. The length of the valve chamber may be varied by rotating the outer member 13 and the sleeve 15 in unison.

When the valve chamber is elongated as shown by Figs. 2 and 3, and air is pumped into the outer member 13, the valve 20 yields, as shown by Fig. 2, and the air passes around the valve to the tire tube. When the tube is inflated to the desired pressure, the stored air exerts an unbalanced pressure on the valve, air entering the chamber 16 from the tube faster than it can escape between the valve and the wall of the recess 17ª. The stored air pressure therefore is enabled to seat the valve and hold it firmly seated as indicated by Fig. 3, until the operator has had time to lock the valve.

The inner member 12 is preferably provided with an enlargement 23, adapted to bear on the inner end of the sleeve 15, when the said sleeve and the outer member 13 are adjusted to contract the valve chamber and lock the valve. Said enlargement, which is preferably a jam or lock nut engaged with the external thread of the member 12, acts in a well known manner to cause the interengaged thread portions of the member 12 and sleeve 15 to bind on each other and thus prevent accidental rotation of the sleeve on said member. The valve which is now clamped between the inner and outer members, acts in like manner to cause the interengaged thread portions of the outer member and sleeve to bind on each other and thus prevent accidental rotation of the outer member in the sleeve. It should be here observed that the diameter of the valve is such that the members 12 and 13 cannot come in contact with each other, this being necessary to insure an operative pressure of the valve against its seat, when the chamber is contracted to lock the valve. It will be seen, therefore, that when the valve is locked, it acts to transmit thread-binding pressure to the member 13.

An internally threaded dust-excluding cap 22 may be engaged with the external thread of the member 13. A rubber washer 24 may be interposed between said cap and the connecting sleeve 15.

The elongation of the valve chamber required to release the valve is not sufficient to permit the valve to leave the recess 17ᵃ, hence the valve is always centered by the wall of said recess, and cannot be laterally displaced from its seat to any appreciable extent.

The valve may advantageously be a polished metal ball, although I do not limit myself to this material.

The members 12 and 13 may have flat sides interrupting the continuity of portions of their screw threads and permitting the application of a wrench. The sleeve 15 may also be externally formed to be engaged by a wrench.

It will be seen that the tubular terminal stem members 12 and 13, and the sleeve or intermediate stem member 15, constitute a three-part stem, the valve seat being an integral part of the member 13, and the air-conducting stop being an integral part of the member 12. The number of essential parts is therefore reduced to a minimum, the valve body 20 constituting a fourth part. The members 12 and 13 may be formed by threading at one operation an elongated tube of indeterminate length and then cutting the tube into shorter lengths, and suitably forming the end portions of said lengths to provide the nipple 14, the valve seat and the air-conducting valve stop. The sleeve 15 is also adapted to be formed with a minimum expenditure of time and labor, said sleeve being of uniform internal diameter from end to end and requiring but one internal screw thread.

I claim:

1. A pneumatic tire valve comprising a three-piece stem having an adjustable valve chamber and composed of an inner tubular terminal stem member having an external screw thread, and a channeled integral end forming an air-conducting valve stop and one end of the valve chamber, an outer tubular terminal stem member having an external screw thread which is a duplicate of the thread of the inner member, and an end forming a valve seat and the opposite end of the valve chamber, and a tubular sleeve forming the margin of the valve chamber and having an internal thread complemental to and engaged with the external threads of the terminal members, whereby the valve chamber may be elongated and contracted, and a ball valve inclosed in said chamber, formed to be clamped against the seat by said stop when the chamber is contracted, and adapted to play loosely between said seat and stop when the chamber is elongated, the said stem being provided at its inner end with means for connection with a tire tube, and at its outer end with means for engagement with a pump connection.

2. A pneumatic tire valve comprising a three-part stem including two alined externally threaded tubular stem members having opposed ends forming the ends of a valve chamber, and a connecting sleeve internally threaded to engage the external threads of said members, one of said opposed ends being formed as a valve seat, and the other being channeled to form an air-conducting valve stop, and a valve in said chamber, the screw thread connection between the parts of the stem permitting an elongation of the valve chamber and a loose movement of the valve therein, and a contraction of the chamber to clamp the valve between said seat and stop, and thus lock the valve against the seat, one of said members being provided with an enlargement adapted to bear on said sleeve and coöperate with the sleeve, the tubular members and the valve in preventing accidental elongation of the valve chamber when the valve is locked.

3. A pneumatic tire valve comprising a tubular outer stem member externally threaded, adapted at its outer end for engagement with a pump connection, and provided at its inner end with a valve seat, a tubular inner stem member externally threaded, provided with means at its inner end for attachment to a tire tube and channeled at its outer end to form an air-conducting valve stop, the inner end of the outer member and the outer end of the inner member forming the end walls of a valve chamber, a connecting sleeve internally threaded to engage the external threads of said members and forming the margin of the valve chamber, the screw thread connections between said parts permitting an elongation and a contraction of said chamber, a valve adapted to close said seat and to abut against said stop, the valve being free to leave the seat and bear on the stop when the chamber is elongated, and locked by the stop against the seat when the chamber is contracted, said stop permitting constant communication between the inner stem member and the valve chamber, and an external locking enlargement on the inner stem member adapted to abut against said sleeve and coöperate with the sleeve, the stem members, and the valve to prevent accidental rotation of the sleeve and outer member when the valve is locked.

In testimony whereof I have affixed my signature.

JOHN H. POOLE.